June 17, 1930. J. KOLLMAN 1,764,685
BAKING PAN
Filed Sept. 19, 1929
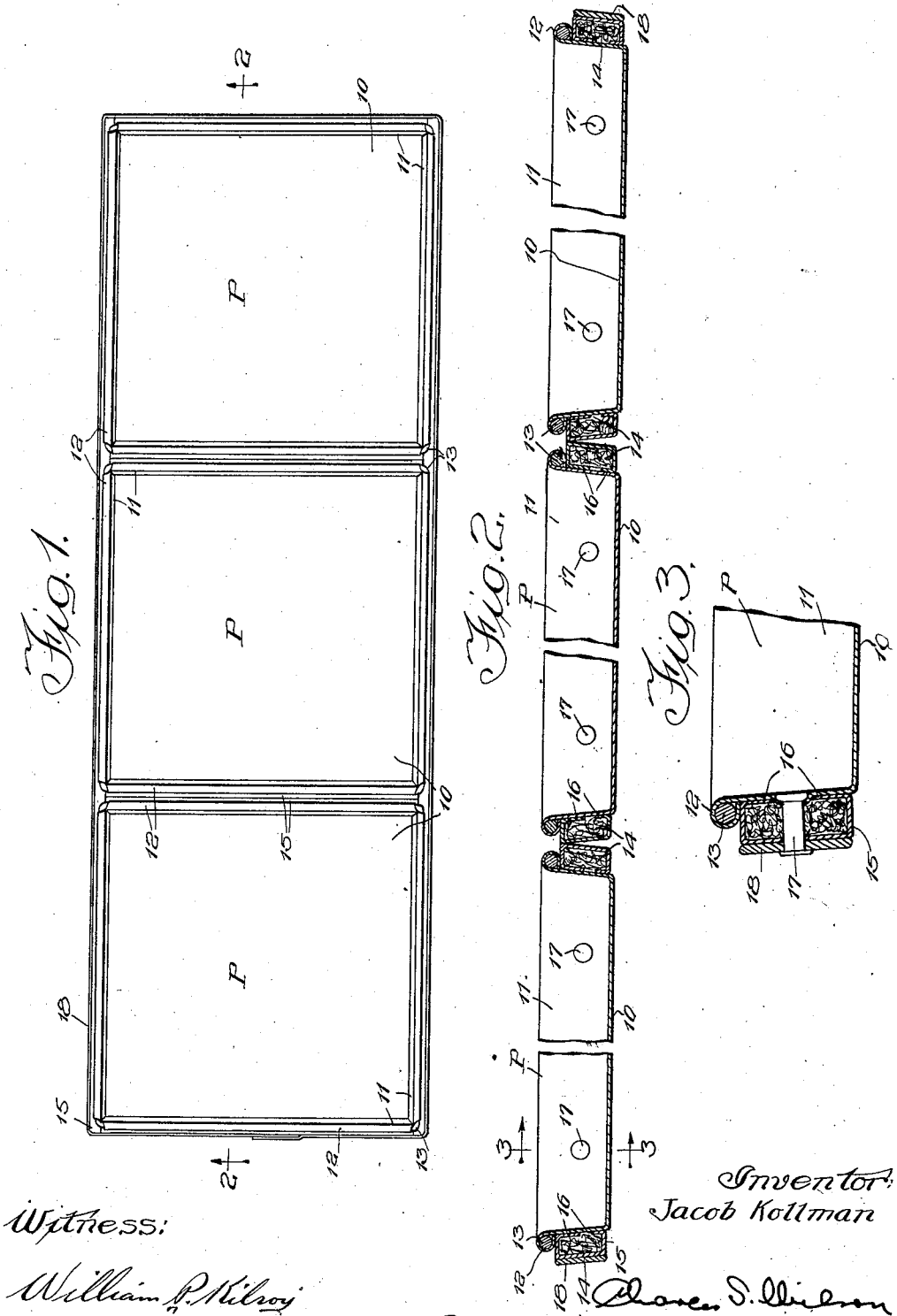
Inventor:
Jacob Kollman Patented June 17, 1930

1,764,685

UNITED STATES PATENT OFFICE

JACOB KOLLMAN, OF CHICAGO, ILLINOIS, ASSIGNOR TO EDWARD KATZINGER COMPANY, OF CHICAGO, ILLINOIS, A CORPORATION OF ILLINOIS

BAKING PAN

Application filed September 19, 1929. Serial No. 393,613.

This invention relates to baking pans, and has for its object the production of a pan in which materials, such as cakes, etc., may be baked without the creation of a crust on the sides or edges thereof.

With the above and other objects in view, as will be apparent, this invention consists in the construction, combination and arrangement of parts, all as hereinafter described, claimed and illustrated in the accompanying drawings, wherein:

Fig. 1 is a plan view of a multiple pan set constructed in accordance with the present invention:

Fig. 2 is a longitudinal vertical section taken along line 2—2 of Fig. 1; and

Fig. 3 is an enlarged vertical fragmentary section taken along line 3—3 of Fig. 2.

In baking operations the use of a pan such as has heretofore been customary, results in a crust being formed on all surfaces of the contents contacting with the walls and bottom of the pan used. This is particularly true in cake baking where crusts are nearly always formed on the edges of the cake. In icing cakes which have crusts on their exposed surfaces, the crust crumbles and mixes with the icing; the icing does not adhere to the cake surface as thoroughly as is desired; the icing does not remain fresh and palatable as long as it would if there were no crusts; and there is less moisture in a cake having crusted exposed surfaces than there is in a cake having no crusted edge surfaces. This is particularly true of jelly rolls where the cake slab is baked flat, covered with jelly and is rolled. If there is a crust on the edges of this type of cake the crust breaks, mixes with the icing and produces an unsightly and undesirable type of product.

Heretofore such cakes have been baked without effort to eliminate the crusts on the edges thereof, with the result that after the baking operation is completed it is frequently necessary to trim the edges of the cake slab to remove the crusts, this being especially true of slabs to be used in jelly rolls.

The present invention contemplates a pan in which cake dough or other similar material may be baked without the production of crusts at the edges of the slab or section so baked, and this is accomplished by the provision of an insulating guard or member upon and contacting with the outer surfaces of side walls of the pan and with the bottom if this is desired. By the use of this pan a cake slab is produced which has no crusted edges which must be trimmed therefrom or which mixes with the icing placed upon the cake surface. A cake slab baked in the present pan may be iced without having the crusts mixing with the icing and the latter will adhere more firmly to the cake; the icing also remains fresher and more palatable for a greater period of time than it otherwise would; and there is a greater percentage of moisture in the cake without the crust than there is in one with a crust, resulting in a more palatable and lasting flavor.

Reference being had more particularly to the drawing P, indicate generally a pan constructed in accordance with the present invention, including a bottom 10, having the side walls 11 secured thereto and extending upwardly therefrom. At their upper edges the side walls 11 are bent outwardly about the wire 13 to form a bead 12. Thus, in the form of the invention illustrated in the drawing, is a relatively shallow pan, having the bottom 10 and the side walls 11, the latter terminating in an exterior continuous bead 12 extending entirely around the lip or edge of the pan.

It is one of the objects of the present invention to prevent crusts being formed on the edges of the material or dough being baked in the pan; that is to say, being formed wher the material contacts with the side walls 11 of the pan. To that end a heat insulating strip 14 of any suitable material, such as asbestos or other heat insulating material, is placed, adjoining each side wall 11 of the pan and extends from approximately the plane of the bottom 10 thereof to a point adjoining the lower edge of the bead 12. To protect this heat insulating strip or member 14, it is surrounded by metallic sheathing 15 of the same material as the pan P. This metallic sheathing 15 completely covers all exposed surfaces of the strip or member 14, and is bent inwardly as at 16, to be clamped and engaged between the member 14 and the exterior face of the adjoining wall 11. The insulating strips or members 14, together with their sheathing 15, are secured to the wall 11 of the pan P by means of the rivets 17, which pass through the sheathing 15, the insulating strip or member 14 and the pan wall 11.

When it is desired to secure a number of the pans P, heretofore described, into a multiple pan set as illustrated in Figs. 1 and 2, a continuous heat insulating member 14 with its metallic sheathing 15 is placed along the alined longitudinal walls 11 of the individual pans P, which are combined to form the pan set, while a separate heat insulating member 14 together with its metallic sheathing 15, is placed along each wall 11 located transversely to the longitude of the pan set. All of the pans P combined to form the pan set, are secured together by a strap 18 which encircles the entire pan set and is secured to the outer walls 11 of pans P and to the heat insulating member 14 by means of the rivets 17 which pass through the strap 18, the sheathing 15, the insulating member 14 and the pan wall 11. Thus the pans are secured together into a pan set and the insulating member 14 and its sheathing 15, which extends in one continuous strip along and throughout the longitudinal sides of the pan set, adds strength to the set and assists the strapping 18 in preventing lateral movement between the units of the pan set.

The heat insulating member 14 prevents the contents of the pan adjoining the walls 11 from becoming crusted so that when the contents of the pan is removed the edges of the slab baked therein are relatively soft and free from crusts. Of course, if it is desired, an insulating member, like 14 and its sheathing may be placed adjoining the bottom 10 of the pan P to prevent a bottom crust on the cake slab.

What is claimed is:

1. The combination with a baking pan, including a bottom and side walls, of an insulator coacting with each of said side walls, comprising a quantity of heat insulating material and an independent sheet inclosing said material.

2. The combination with a baking pan, including a bottom and side walls, of an insulator coacting with each of said side walls, comprising a quantity of heat insulating material, and an independent sheet inclosing said material, the edges of said sheet being clamped between the insulator and the pan wall.

3. The combination with a baking pan, including a bottom and side walls, the later having outstanding beads at the edges thereof, of an insulator coacting with each wall adjoining the bead thereof, comprising a quantity of insulating material, and an independent metallic sheet inclosing said material.

4. The combination with a baking pan, including a bottom and side walls, the latter having outstanding beads at the edges thereof, of an insulator coacting with each wall adjoining the bead thereof, comprising a quantity of insulating material and an independent metallic sheet inclosing said material, the edges of said sheet being clamped between the insulator and the pan wall.

5. The combination with a baking pan, including a bottom and side walls, the latter having outstanding beads at the edges thereof, of an insulator coacting with each wall adjoining the bead thereof, comprising a quantity of insulating material, an independent metallic sheet inclosing said material, the edges of which are clamped between the insulator and the pan wall and rivets passing through the pan wall, the metallic sheet, and insulating material.

6. The combination with a plurality of baking pans, of an insulator coacting with and covering the walls of each pan, comprising a quantity of insulating material, and an independent metallic sheet inclosing said material and rivets securing said insulators to the pan walls.

7. The combination with a plurality of baking pans, of an insulator coacting with the wall of each pan, comprising a quantity of insulating material, an independent metallic sheet inclosing said material, rivets securing said insulators to the pan wall, and straps connecting said pans one to the other and secured to the pans by the aforesaid rivets.

8. The combination with a plurality of spaced baking pans of an insulator coacting with the walls of each pan, the insulators coacting with adjoining walls occupying substantially all of the space between the pans, straps connecting said pans, and means for securing said straps and adjacent insulators to the walls of the pans.

JACOB KOLLMAN.